United States Patent
Odaohhara et al.

[11] Patent Number: 6,157,166
[45] Date of Patent: Dec. 5, 2000

[54] BATTERY SWITCHING CIRCUIT AND A COMPUTER SYSTEM HAVING SAME

[75] Inventors: Shigefumi Odaohhara; Akira Fukushima, both of Yamato; Masaki Kobayashi, Tokyo-to, all of Japan

[73] Assignee: International Business Machines Corporation, Armonk, N.Y.

[21] Appl. No.: 09/300,808

[22] Filed: Apr. 27, 1999

[30] Foreign Application Priority Data

Sep. 24, 1998  [JP]  Japan ................................ 10-269454

[51] Int. Cl.$^7$ ............................................ H02J 7/00
[52] U.S. Cl. ........................................ 320/121; 320/150
[58] Field of Search .................................. 320/121, 138, 320/150, 154

[56] References Cited

U.S. PATENT DOCUMENTS

| | | | |
|---|---|---|---|
| 4,843,520 | 6/1989 | Nakatani | 361/739 |
| 5,243,269 | 9/1993 | Katayama et al. | 320/126 |
| 5,300,874 | 4/1994 | Shimamoto et al. | 320/106 |
| 5,327,371 | 7/1994 | Maruyama et al. | 365/1 |
| 5,436,513 | 7/1995 | Kaye et al. | 307/71 |
| 5,557,738 | 9/1996 | Townsley et al. | 307/66 |
| 5,666,006 | 9/1997 | Townsley et al. | 307/66 |
| 5,794,626 | 7/1998 | Odaohara | 320/128 |

*Primary Examiner*—Peter S. Wong
*Assistant Examiner*—Pia Tibbits
*Attorney, Agent, or Firm*—Anthony N. Magistrale; Andrew Dillon

[57] ABSTRACT

Described is a battery switching circuit in which a first battery and a second battery are connected to a common feeding point via a first feeding circuit and a second feeding circuit each including a semiconductor switch. The switch is alternately turned on so that one of the first and second batteries supplies electric power to the feeding point at a time. The battery switching circuit includes a first temperature sensor disposed in the proximity of the switch. A temperature detector is connected to the temperature sensor for generating an operational output in response to the output of the temperature sensor when the temperature of the switch exceeds a predetermined temperature. Lastly, a circuit is connected to the switch and is responsive to the operational output of the temperature detector for turning off the switch disposed in the proximity of the temperature sensor. Because the switch is protected from being overheated, it can be mounted on a low cost nonmetallic substrate.

4 Claims, 3 Drawing Sheets

BATTERY SWITCHING CIRCUIT AND A COMPUTER SYSTEM HAVING SAME

BACKGROUND OF THE INVENTION

1. Field of the Invention

This invention relates to a battery switching device for a computer and, more particularly, to a battery switching device which includes protection means for assuring the safety of the computer system when an abnormal condition occurs in the battery switching circuit.

2. Description of Related Art

Generally a notebook type computer is provided with a battery pack and a user operates the computer by supplying power from the battery when there is no AC power supply available. A notebook computer having a liquid crystal color display normally has an operable time of about 3 hours when driven by a battery which is fully charged. However, 3 hours of operation with a fully charged battery may not be satisfactory to users.

In view of this, a notebook computer which mounts a pair of batteries and switches from one battery to the other when the voltage of the one battery decreases below a predetermined value has been proposed in Published Unexamined Japanese Patent Application (PUPA) No. 8-549679.

In addition to battery powered computers there are portable electronic devices for use by consumers in which power is supplied from a battery. As a result, protecting the battery is of a major concern in such devices because a chargeable battery is considerably expensive for consumers. In particular, various protection circuits are known which monitor the temperature of the battery and disconnect the battery when the temperature is raised to a certain degree. PUPA No. 8-64258 is an example of such a protection circuit.

In the computer having a battery switching device as disclosed in PUPA No. 8-549679, each battery is connected via switches to a common feeding point from where electrical power is solely supplied. Two field effect transistors (FETs) F1, F2 are turned on while two other FETs (F3 and F4) are turned off or both F1 and F2 are turned off while both F3 and F4 are turned on. When the switch is turned on, the other one of the batteries is connected. If, for some reason, an over current flows through the battery in use, the battery is damaged and occasionally can explode which extends the damage to the periphery. Accordingly, there is a need for protecting the battery and its surroundings. The conventional solution has been to obtain such protection by monitoring heating of the battery.

FIG. 1 shows an example of such a conventional power source of a battery switching type. A main battery and a second battery supply a DC—DC converter via field effect transistors FET1, FET2, FET3, FET4 which are switching devices. Both FET1 and FET2 are turned on while both FET3 and FET4 are turned off or both FET1 and FET2 are turned off while both FET3 and FET4 are turned on to connect one of the batteries to the converter. FET1 and FET2 are complementary to each other and connected in series as are FET3 and FET4. Therefore, the parasitic diodes of the FETs are connected in opposite directions as shown to prevent a FET which is turned off from passing a current. When a FET is damaged by over current, the source and the drain electrodes are typically short circuited. For example, when the voltage of the main battery is higher than the second battery and the main battery is connected for use while the second battery is disconnected, a short circuit occurring in FET3 causes a heavy current to flow to the parasitic diode of FET4 to overheat it. Not only is the FET destroyed by overheating but also a solder may be molten and damage the periphery. The battery is also damaged by a large current flowing therethrough.

The prior art technology does not recognize such a unique problem in a power supply of a type in which power is switched between two batteries. Because each battery is connected to a common connection point via the switches in the power supply of a battery switching type, a short circuit of a switch which is turned off caused by an over current causes a current to flow from the unused battery of a higher voltage to the battery in use of a lower voltage. Because the internal resistance of the battery is low, there is a danger that a large current is induced which not only damages the battery but also damages elements in the current path.

The causes of such a short circuit can include an over voltage, an over current and, occasionally, a defect in the switch itself. An over voltage may be induced, for example, when some set screw is loosened and rolls away to short circuit a high voltage portion and a switch, a user spills water into the computer housing to short circuit a high voltage portion and a switch, or the user drops a pin into a slot of the housing (a louver of a fan, etc.) inducing a short circuit. An over current may be induced, beside those caused by an over voltage, when a large current momentarily flows from an AC adapter to the battery when it is mounted, for example. The power source of the battery switching type may be installed in portable electronic devices, such as notebook computers, which consumers carry around. Considering that such portable electronic devices are swung around while they are carried and are used in an outdoor environment, a failure which induces an over current is likely to occur.

Because an over current brings a rise of temperature, a battery can be protected by conventionally monitoring the temperature of the battery. However, there remains a danger to elements including a switch of the switching circuit being damaged by the over current though the battery could be protected. This is because an element such as a switch overheats more quickly than the battery. When an element such as a switch is overheated, not only is the switch damaged but also solder is molten and flows out or a substrate is damaged so that the damage extends to the periphery of the switch. Once this happens, there is hardware damage and it has to be repaired in a service center or the like. In order to solve such a problem, there is a need for a switching circuit which protects itself and a battery upon an over current condition.

Overheating can be prevented by attaching the switch to a thermally conductive heat sink or an aluminum substrate to protect the switch but this does not prevent an over current per se. In addition, a heat sink or an aluminum substrate is relatively expensive and it is desired that a less expensive component be used. If a nonmetallic substrate such as a conventional epoxi substrate can be used in place of a metallic heat sink or substrate, this would contribute to a reduction in manufacturing cost and weight. Therefore, a low cost and light weight switching circuit for safely protecting it from an over current is desired.

Further, it is desired that not only the switch and the battery be safely protected when a battery switching circuit is installed in portable electronic equipment but also the size, weight and cost of the equipment are further reduced.

OBJECTS OF THE INVENTION

Accordingly, it is an object of the present invention to provide a battery switching circuit which includes protection means for assuring the safety of a system when an abnormal condition is generated in the circuit.

Another object of this invention is to provide a battery switching device which is provided with protection means for detecting an over current to disconnect a switching circuit.

It is another object of this invention to provide a battery switching device which is provided with protection means which are low cost and light weight.

It is a further object of this invention to provide a light weight, low cost portable electronic device with such battery switching device.

SUMMARY OF THE INVENTION

The present invention is directed to a battery switching circuit and a portable electronic apparatus having the same. A first battery and a second battery are connected to a common feeding point via a first feeding circuit and a second feeding circuit each including a semiconductor switch means. The switch means is alternately turned on so that one of the first and second batteries supplies electric power to the feeding point at a time. The battery switching circuit includes a first temperature sensor disposed in the proximity of the switch means. Temperature detection means are connected to the temperature sensor for generating an operational output in response to the output of the temperature sensor when the temperature of the switch means exceeds a predetermined temperature. Lastly, circuit means are connected to the switch means and is responsive to the operational output of the temperature detection means for turning off the switch means disposed in the proximity of the temperature sensor. Because the switch is protected from being overheated, it can be mounted on a low cost nonmetallic substrate such as an epoxi substrate.

DETAILED DESCRIPTION OF THE INVENTION

Figure 1:
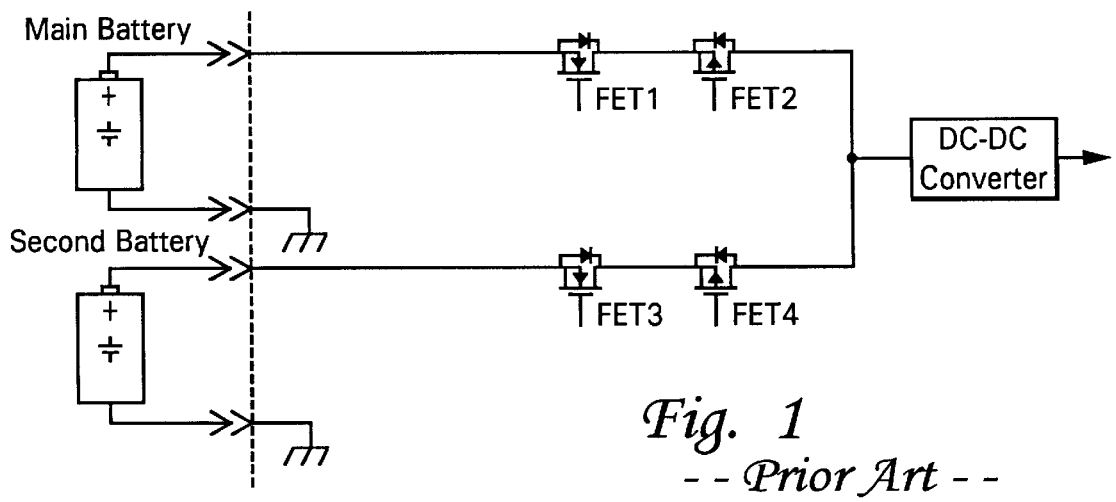
FIG. 1 is a circuit diagram of a main part of a conventional battery switching circuit.
Figure 2:
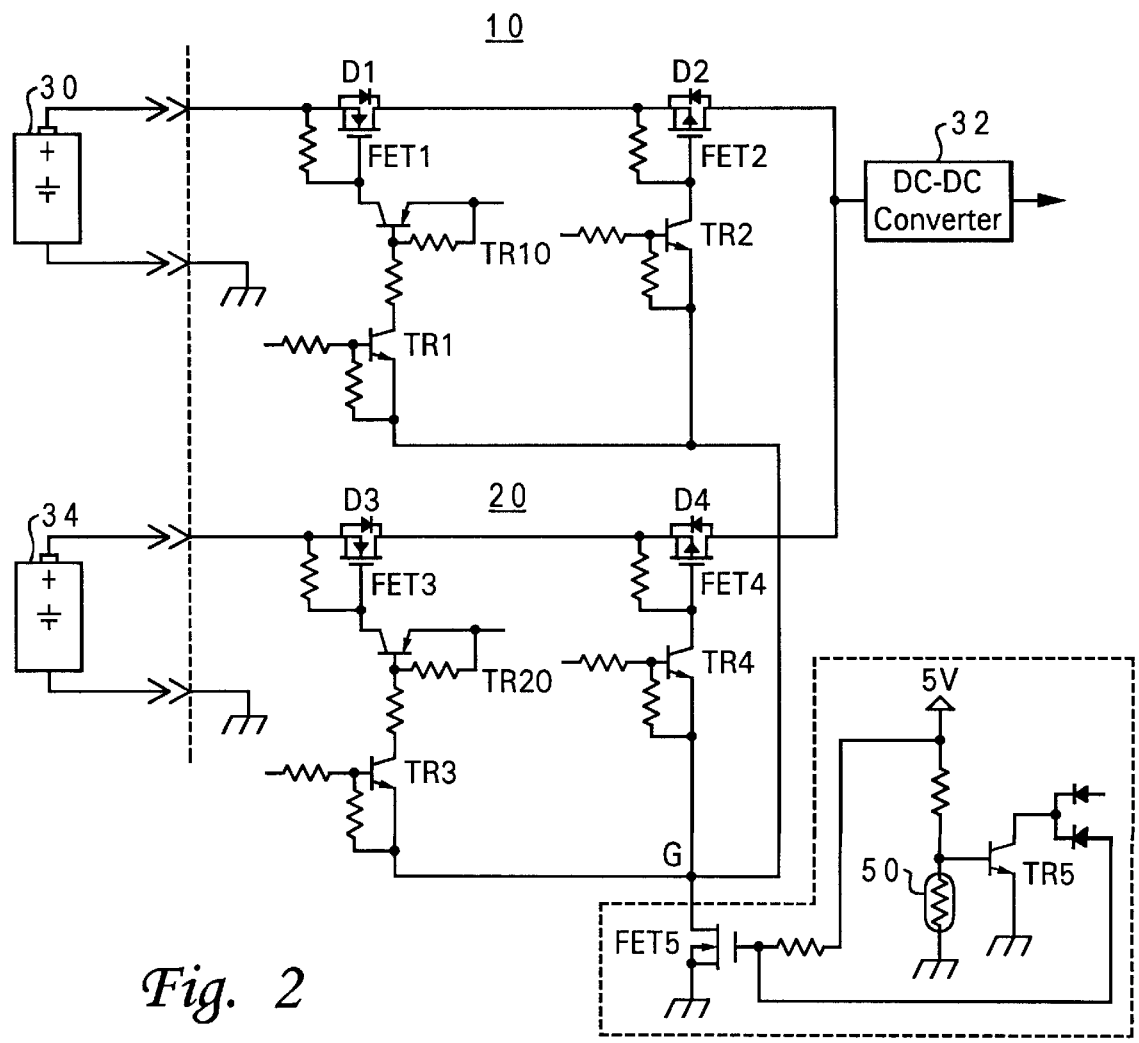
FIG. 2 is a circuit diagram of a battery switching circuit in accordance with the present invention.

Referring now to FIG. 2, there is shown a battery switching device for a computer according to the present invention. The battery switching device includes a first series circuit 10 and a second series circuit 20. The first series circuit 10 includes field effect transistors ("FET") FET1 (N channel) and FET2 (P channel) with drain electrodes D connected to each other. A power MOSFET may be used as a FET. The second series circuit 20 similarly includes FET3 (N channel) and FET4 (P channel) with drain electrodes D connected to each other.

The N channel FET1 and FET3 include internal diodes D1 and D3 respectively, the cathodes of which are connected to the drain electrodes D and the anodes of which are connected to source electrodes S. The P channel FET2 and FET4 include internal diodes D2 and D4 respectively, the cathodes of which are connected to the source electrodes S and the anodes of which are connected to drain electrodes D.

Figure 3:
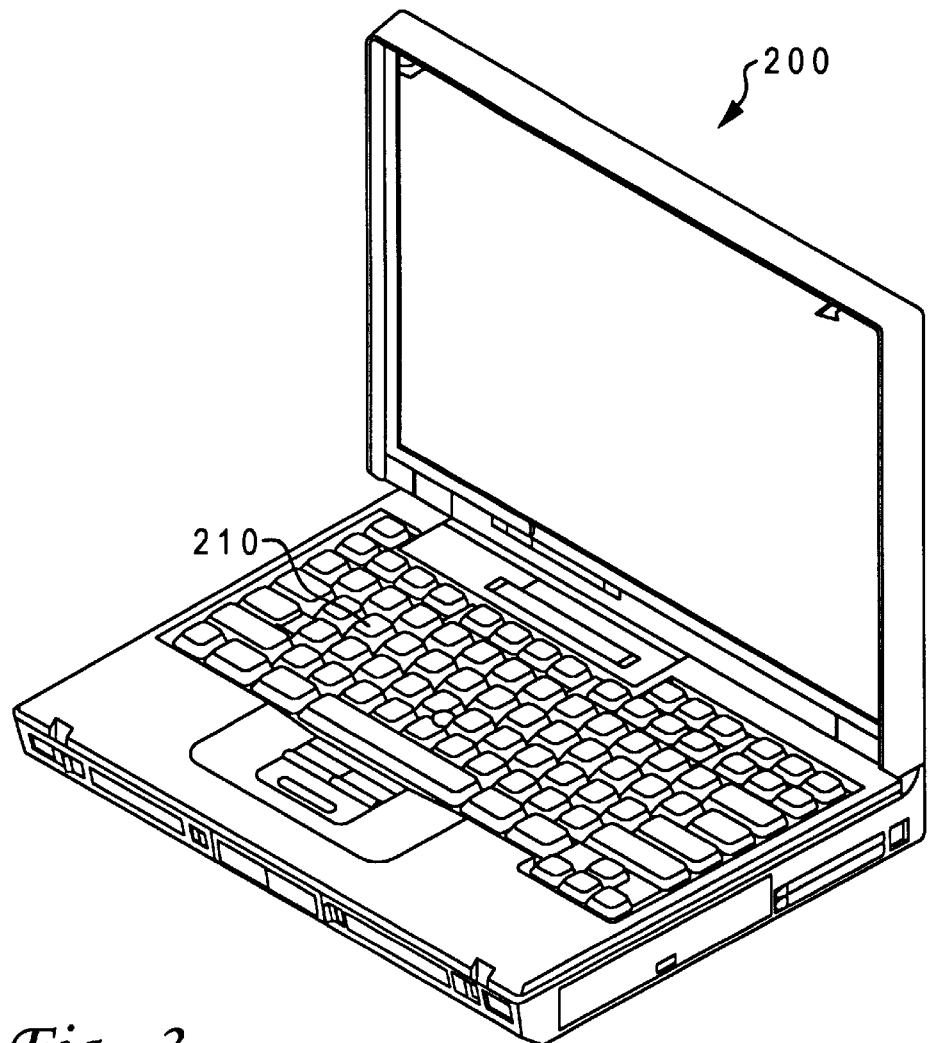
FIG. 3 is a diagram of a notebook computer having a battery switching circuit therein according to the present invention.

In FIG. 3, a computer 200 has a battery pack (battery) receptacle (not shown) which is covered with a keyboard 210 which can be opened and closed. The source electrode S of FET1 is connected to a first battery pack 30 which is detachably mounted in the battery pack receptacle of the notebook computer 200 while the drain electrode of FET2 is connected to an input of a DC/DC converter 32 which supplies electric power to the computer 200. A keyboard switch is provided in the computer to detect an open/close state of the keyboard. The source electrode S of FET3 is connected to a second battery pack 34 which is detachably mounted in the battery pack receptacle of the notebook computer 200 while the drain electrode of FET4 is connected to the input of the DC/DC converter 32.

Turning back to FIG. 2, when the first battery pack 30 or the second battery pack 34 is removed from the computer housing by opening the keyboard, the electrical connection between the first series circuit 10 and the first battery pack 30 or the electrical connection between the second series circuit 20 and the second battery pack 34 is released. In other words, the first battery pack 30 and the first series circuit 10 as well as the second battery pack 34 and the second series circuit 20 are detachably connected to each other.

Also, an AC/DC adapter (not shown) for converting from AC to DC is connected to the input of the DC/DC converter 32 via a connector provided in the side surface of the computer housing and a diode installed in the computer 200. The AC/DC adapter can be removed from the computer housing at the connector portion.

A circuit which is connected to the gate electrodes of FET1 through FET4 for switching between the first and the second battery packs 30, 34 is of a same circuit configuration for both the first series circuit 10 and the second series circuit 20. The gate electrode of FET1 is connected to the collector electrode of a pnp transistor TR10. The same collector electrode is connected to the source electrode of FET1 via a resistor. The emitter electrode of the transistor is connected to a source of a positive potential. The base electrode of the transistor TR10 is connected to the collector electrode of a switching control transistor TR1 via a resistor. The emitter electrode of the transistor TR1 is connected to a common connection point G. The transistor TR2 is connected to the gate electrode of FET2 and is connected in a similar manner to the transistor TR1.

The gate electrode of FET3 is connected to the collector electrode of a pnp transistor TR20. The same collector electrode is connected to the source electrode of FET3 via a resistor. The emitter electrode of the transistor TR20 is connected to a source of a positive potential. The base electrode of the transistor TR20 is connected to the collector electrode of a switching control transistor TR3 via a resistor. The emitter electrode of the transistor TR3 is connected to a common connection point G. The transistor TR4 is connected to the gate electrode of FET4 and is connected in a similar manner to the transistor TR3. A control signal is applied to the base electrodes of the transistors TR1 through TR4 to switch between the batteries 30 and 34. The control signal can be the same as the one which is disclosed in PUPA No. 8-54967 or any other suitable switching circuit may be used.

The connection point G is essentially a ground point and is typically connected to the ground. In the present invention, the connection point G is connected to the ground via FET5. It will be seen that FET1 through FET4 are on/off controlled by their control FETs if FET5 is conductive while they are turned off if FET5 is turned off.

The gate electrode of FET5 is connected to a 5V potential via a resistor and also to the collector electrode of the transistor TR5. A resistor and a temperature sensor 50 such as a thermister are connected between the 5V potential and the ground, and the junction of the resistor and the sensor 50 is connected to the base electrode of the transistor TR5. The resistance of the temperature sensor 50 is low when the temperature of the sensor 50 is low so that the transistor TR5 is not conductive. The collector electrode of the transistor TR5 is in a high potential which is supplied to the gate electrode of FET5 to make it conductive. As a result, the connection point G is connected to the ground so as to allow FET1 through FET4 to be controlled for switching. When the temperature of the sensor 50 becomes high, the resistance of the temperature sensor 50 becomes high that the transistor TR5 is conductive. The collector electrode of the transistor TR5 is in a low potential which is supplied to the gate electrode of FET5 to make it nonconductive. As a result, the connection point G is disconnected from the ground so as to turn off FET1 through FET4. In short, when the temperature sensor 50 is in a high temperature, all FET1 through FET4 are turned off and both batteries 30 and 34 are disconnected. The level supplied to FET5 is also supplied to the system as a shut down signal to shut down the system.

Because the temperature sensor 50 is used for sensing an abnormal rise of the temperature of FET1 through FET4, it is disposed in the proximity of FET1 through FET4.

Figure 4:
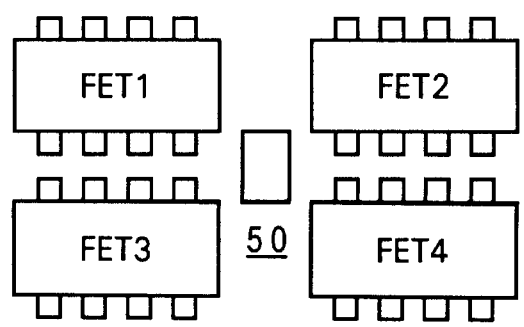
FIG. 4 is a diagram showing an example of disposition of temperature sensors of the protection circuit of the present invention.

FIG. 4 shows an example where FET1 through FET4 are disposed as close as possible and the temperature sensor 50 is disposed in the center of the FETs.

The temperature sensor 50 may be disposed for each of FET1 through FET4 or for every pair of FETs. In this case, only the FETs in the side where an abnormal condition is induced can be disconnected. Because the side where there is no abnormal condition is not disconnected, the system is fed from this side without being shut down.

Figure 5:
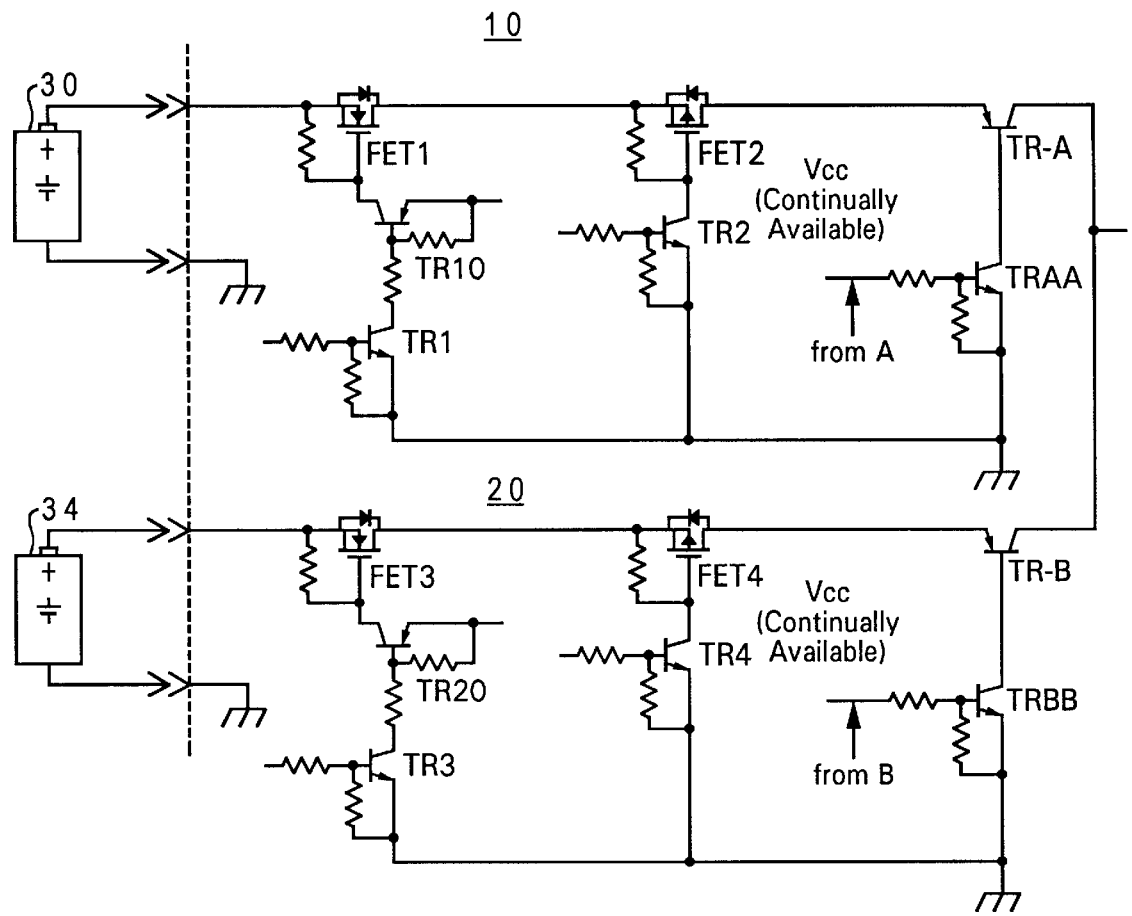
FIG. 5 is a circuit diagram of another embodiment of a battery switching circuit in accordance with the present invention.

FIG. 5 shows a second embodiment of the present invention. While the circuits around FET1 through FET4 are the same as FIG. 2, FIG. 5 is different from FIG. 2 in that FET2 is connected to a disconnecting transistor TRA, and FET 4 is connected to a disconnecting transistor TRB. The emitter electrode of the transistor TRA is connected to FET2 while the collector electrode thereof is connected to the converter 32 (not shown). Similarly, the emitter electrode of the transistor TRB is connected to FET2 while the collector electrode thereof is connected to the converter 32. The base electrodes of the transistors TRA and TRB are connected to the collector electrodes of control transistors TRAA and TRBB, respectively, and the transistors TRA and TRB are on/off controlled thereby. The base electrodes of the control transistors TRM and TRBB receive a signal level from the temperature detection circuit of FIG. 6.

Figure 6:
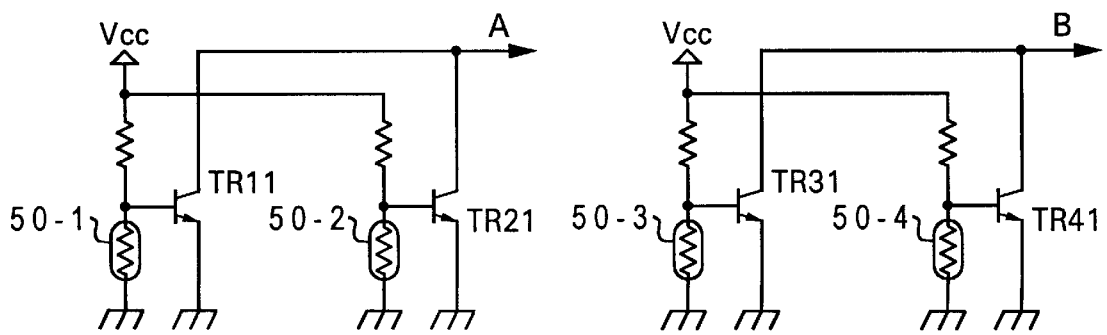
FIG. 6 is a circuit diagram of a temperature detection circuit connected to the circuit of FIG. 5.

FIG. 6 shows 4 temperature detection circuits for FET1 through FET4. The left side is a temperature detection circuit for FET1 and FET2 and provides a single common output. The right side is a temperature detection circuit for FET3 and FET4 and provides a single common output. The 4 detection circuits are of a same circuit configuration and have temperature sensors 50-1, 50-2, 50-3, 50-4, respectively, which are connected to the base electrodes of related transistors TR11, TR21, TR31, TR41 in a similar manner to FIG. 2. The collector electrodes of the transistors TR11 and TR21 are connected in common to an output point A. The collector electrodes of the transistors TR31 and TR41 are connected in common to an output point B. An abnormal temperature rise of any temperature sensor causes its resistance to be raised and causes the associated transistor to be conductive to lower the potential of the output point A or B. This causes the transistors TRAA or TRBB of FIG. 6 to be turned off to shut off the disconnecting transistor TRA or TRB. Each temperature sensor is disposed in the proximity of each of FET1 through FET4.

According to the above configuration, the FET need not be mounted on a heat sink because the FET is not overheated and may be mounted on a nonmetallic substrate such as a conventional epoxi substrate together with other circuit components. While a metallic substrate or sink of an aluminum and the like is a separate element from the substrate and has to be separately attached, there is no need to use such metallic substrate or sink according to the present invention. In addition, an epoxi substrate is less expensive and lighter in weight than a metallic substrate or sink.

While this invention has been described relating to a specific embodiment, it will be evident that various modifications are within the scope of the present invention. For example, the disconnecting transistors TRA and TRB of FIG. 5 which are shown as a bipolar type may be replaced with a power MOSFET switch or a mechanical switch. Further, the disconnecting transistor or switch may be placed at any point in the feeding circuit of the battery. For example, some batteries have such a protection switch incorporated therein. In such a case, the switch may be controlled by the output of the temperature detection circuit. When the parasitic diode of the FET is connected in a reverse direction, the polarity of the FET may be opposite to the polarity shown in the figure.

By preventing overheating of the FETs caused by over current, damage to the FETs, peripheral circuits thereof, the substrate and the battery are prevented. Because there is no danger that the FET will overheat, there is no need to use a metallic heat dissipating substrate or a heat sink and a less expensive epoxi substrate can be used.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed:

1. A battery switching circuit in which a first battery and a second battery are connected to a common feeding point via a first feeding circuit and a second feeding circuit, said battery switching circuit comprising:

a switch means within each of said first and second feeding circuits, wherein said switch means selectively allows one of said first and said second batteries to alternatively supply electric power to said feeding point;

a first temperature sensor disposed in close proximity to said switch means, such said first temperature sensor shares a same thermal environment as said switch means;

temperature detection means connected to said temperature sensor for generating an operational output in response to the output of said temperature sensor when the temperature of said switch means, as sensed by said first temperature sensor, exceeds a predetermined threshold; and circuit means responsive to said operational output of said temperature detection means for turning off said switch means in response to said sensor sensing a temperature above said predetermined threshold.

2. The battery switching circuit of claim 1, further including a second temperature sensor and wherein said first and second temperature sensors are disposed in the proximity of said switch means in the first and second feeding circuits respectively, and wherein said temperature detection means includes one of said sensors provided in each of said first and second feeding circuits.

3. The battery switching circuit of claim 1, wherein said switch means is mounted on a nonmetallic substrate.

4. A battery switching circuit in which a first battery and a second battery are connected to a common feeding point via a first feeding circuit and a second feeding circuit, said battery switching circuit comprising:

a semiconductor switch means within each of said first and second feeding circuits, wherein said switch means is alternately turned on so that one of said first and said second batteries supplies electric power to said feeding point at a time;

a disconnecting switch connected in series with respective switch means in said first and second feeding circuits, a temperature sensor disposed in close proximity to said switch means, such said first temperature sensor shares a same thermal environment as said switch;

temperature detection means connected to said temperature sensor for generating an operational output in response to the output of said temperature sensor when the temperature of said switch exceeds a predetermined threshold; and circuit means responsive to said operational output of said temperature detection means for turning off said disconnecting switch in response to said sensor sensing a temperature above said predetermined threshold.

\* \* \* \* \*